Nov. 11, 1924.

1,515,078

P. E. SHEE

FLOWER HOLDER

Filed Aug. 30, 1922

Inventor
Parke E. Shee

By Cushman, Bryant & Darby
Attorneys

Patented Nov. 11, 1924.

1,515,078

UNITED STATES PATENT OFFICE.

PARKE E. SHEE, OF LANCASTER, PENNSYLVANIA, ASSIGNOR OF ONE-HALF TO EDWARD I. NOBLE, OF LANCASTER, PENNSYLVANIA.

FLOWER HOLDER.

Application filed August 30, 1922. Serial No. 585,221.

*To all whom it may concern:*

Be it known that I, PARKE E. SHEE, a citizen of the United States, residing at Lancaster, in the county of Lancaster and State of Pennsylvania, have invented new and useful Improvements in Flower Holders, of which the following is a specification.

The present invention relates to flower holders, and has for its object to provide a holding device designed particularly for use in cemeteries and in mausoleums, the latter construction having been made the subject of a separate application Serial No. 635,583, filed April 7, 1923, under official requirement.

It has for its object to provide a flower holder and support therefor which will be ornamental in appearance, may be readily installed or set up, and as quickly removed, and which will be economical in construction and so made as that it will stand continuous use without likelihood of breakage or danger of wearing out.

In the drawing herewith I have illustrated my invention, designed particularly for graves, or other plots where it is desired to use flowers for ornamentation.

In the drawings:—

Figure 1:
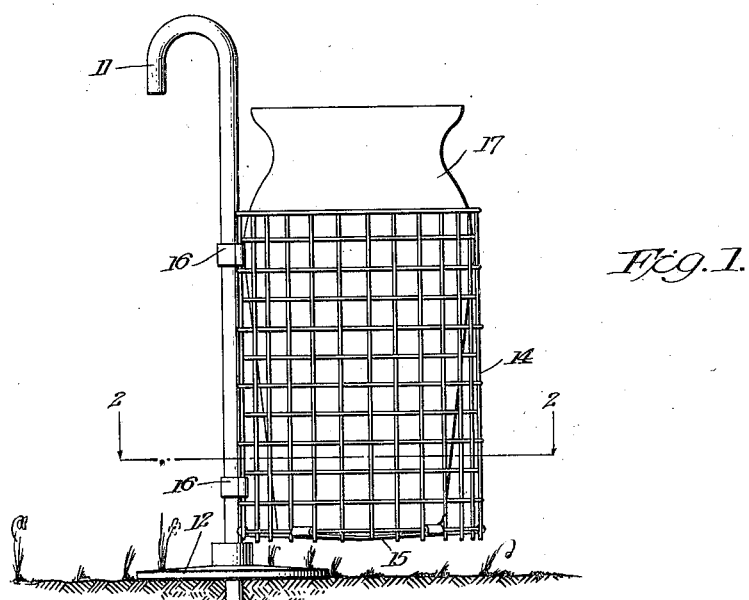
Fig. 1 is a view in side elevation of a holder constructed in accordance with my invention designed for use in burial or other plots which it is desired to ornament with flowers.
Figure 2:
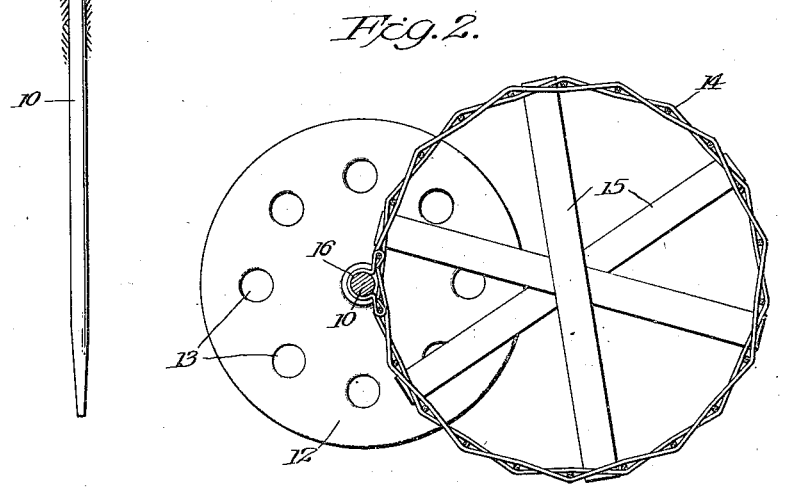
Fig. 2 is a view in horizontal cross section of the device shown in Fig. 1 on substantially the line 2—2 of Fig. 1.

Referring to the drawings by numbers, like numbers indicating like parts in the several views, 10 indicates the support for the holder which, as shown, consists of a rod having a lower penetrating end, and preferably tapered or pointed at its tip in order that it may be readily forced into the ground.

At its upper end the rod 10 has the hook 11, preferably formed as shown, although other types of hook formation could be used, or a closed loop could be provided, the purpose of this hook or loop end 11 being to provide a finger hold by which the device may be manipulated, either for forcing it into the ground, or for withdrawing it therefrom.

Between its ends the said rod 10 is provided with a ground plate 12 of a suitable area to give a firm support for the rod 10 and prevent it being tilted from its normal vertical position by the weight of the flower holder and the flowers, which will presently be described. The said plate 12 may be secured to the rod in any suitable way, and, if desired, may be made adjustable thereon, although preferably it will be fixed in proper position on the said rod 10. The plate 12 will preferably have a series of openings 13 through it, these openings to be of any desired form and arrangement, the present example showing them round and symmetrically arranged. The purpose of these openings is primarily to provide apertures through which the grass or other vegetation may pass so that the plate will, after it has been in place some time, be practically concealed from view by the grass growing about it and through the apertures, and, furthermore, this apertured plate will not deaden and kill the grass over the complete area covered by it, the openings 12 therein permitting the grass to grow.

Disposed laterally with respect to the rod 10 is a receptacle 14, this being shown, in the present instance, as a screen mesh or reticulated receptacle formed in a cylinder of suitable wire mesh, and having across its bottom the diametrically disposed strips 15 which give an open bottom which will readily clear itself of accumulations, and the reticulated or wire mesh body portion forms a light and attractive container which lends itself to decorative purposes in that flowers, ornamental grasses, and the like, may be inserted through the mesh of the screen. The receptacle 14 is preferably secured to the rod 10 by means of the clips 16, the loops of which surround the rod with the ends thereof being engaged and bent over the vertical wires of the cylindrical receptacle 14.

This receptacle will preferably carry a container 17 of glass, metal, or other suitable ware, for the reception of the flowers and to contain water, but it is obvious that the flowers could be intertwined and mounted in the receptacle 14 directly without use of the container 17, if desired.

It will be observed that the construction is such that when flowers in any quantity are placed in the container, the device will practically be concealed, and there will be no unsightly parts or projections extending above the flowers. When the plots are being cared for, the grass mowed, and the like, the attendants may readily remove the device without disturbing the decorations by simply pulling it from the ground through the medium of the hook 11, and it can then be readily replaced. The ground plate 12, as shown, is of considerable area and extends outwardly to substantially the center of the laterally offset flower receiving holder 14. This plate 12 of the area specified gives a very firm support for the device and prevents danger of tilting by reason of the weight of the flowers and the water in the container when the device is in use, so that it will maintain always its vertical upright position, and unsightly tilting and lopsided effects will be avoided.

It will be understood, of course, that changes from the specific mechanical structure and details may be made within the skill of the workman and designer without departing from the spirit of my invention.

I claim:—

A flower holder comprising a rod having a pointed lower end and an integral hook at its upper end, a ground plate having a central opening mounted on said rod, said ground plate having a series of circumferentially spaced openings for permitting vegetation to pass therethrough, and a laterally offset, reticulated container having a skeleton bottom secured at its side wall to said rod above and in overlapped position relative to said ground plate.

In testimony whereof I have hereunto set my hand.

PARKE E. SHEE.